US006950133B2

United States Patent
Yoshiwara et al.

(10) Patent No.: US 6,950,133 B2
(45) Date of Patent: Sep. 27, 2005

(54) METHOD OF DETECTING DEFECTIVE PIXELS OF A SOLID-STATE IMAGE-PICKUP DEVICE AND IMAGE-PICKUP APPARATUS USING THE SAME

(75) Inventors: Kazuhisa Yoshiwara, Kodaira (JP); Hideo Onodera, Higashiyamato (JP)

(73) Assignee: Hitachi Kokusai Electric Inc., Tokyo (JP)

(*) Notice: Subject to any disclaimer, the term of this patent is extended or adjusted under 35 U.S.C. 154(b) by 834 days.

(21) Appl. No.: 09/917,705

(22) Filed: Jul. 31, 2001

(65) Prior Publication Data

US 2003/0025813 A1 Feb. 6, 2003

(30) Foreign Application Priority Data

Jul. 31, 2000 (JP) ........................................ 2000-231524

(51) Int. Cl.[7] ................................................. H04N 9/64
(52) U.S. Cl. ........................ 348/247; 348/250; 348/280
(58) Field of Search ................................ 348/241, 246, 348/262, 272–273, 280, 247

(56) References Cited

U.S. PATENT DOCUMENTS 6,081,917 A * 6/2000 Yasui et al. ................. 714/746
6,424,382 B1 * 7/2002 Yoshida et al. ............. 348/607
6,683,643 B1 * 1/2004 Takayama et al. .......... 348/247

FOREIGN PATENT DOCUMENTS

| EP | 0440563 A2 | 8/1991 |
| EP | 0635973 A1 | 1/1995 |
| EP | 07030906 | 1/1995 |
| JP | A-10-98651 | 4/1989 |
| JP | 10243300 | 9/1998 |

OTHER PUBLICATIONS

European Search Report, EPO1 11 7719, Hitachi Kokusai Electric, Inc., Appl. No. 01117719.3–1241, Ref. A36277EP.

* cited by examiner

Primary Examiner—Ngoc-Yen Vu
Assistant Examiner—Carramah J Quiett
(74) Attorney, Agent, or Firm—Mattingly, Stanger, Malur & Brundidge, P.C.

(57) ABSTRACT

A defective pixel detecting method and an image-pickup apparatus having a plurality of solid-state image-pickup devices each receiving respective one of spectral lights obtained by separating light incident to the image-pickup apparatus, generating, for each spectral light, a value relating to an inspected defective pixel on an associated solid-state image-pickup device located at a corresponding same image-pickup point among the plurality of solid-state image-pickup devices based on a signal level produced from the inspected pixel and signal levels produced from a plurality of pixels of the associated solid-state image-pickup device in the vicinity of the inspected pixel, and determining the solid-state image-pickup device that generated a defective pixel based on the values obtained with respect to the plurality of solid-state image-pickup devices.

9 Claims, 4 Drawing Sheets

METHOD OF DETECTING DEFECTIVE PIXELS OF A SOLID-STATE IMAGE-PICKUP DEVICE AND IMAGE-PICKUP APPARATUS USING THE SAME

BACKGROUND OF THE INVENTION

The present invention relates to a method of detecting defective pixels produced in a solid-state image-pickup device such as a charge-coupled device (CCD) used in a television camera and more particularly to a defective pixel detecting method and an image-pickup apparatus having a defective pixel correcting function using the detecting method capable of detecting in real time whether any defective pixel occurs in any image-pickup device or not in the image-pickup apparatus having a plurality of image-pickup devices and in which incident light from an imaging field is separated into R, G, B spectral components respectively and the spectral lights are imaged by the plurality of image-pickup devices.

A conventional method of detecting defective pixels in solid-state image-pickup devices of a television camera includes, as disclosed in, for example, JP-A-10-98651, optical means for irradiating a photoelectric conversion plane of solid-state image-pickup devices with an optical image from an object to be imaged at every first period, means for reading out electric signal charges of the solid-state image-pickup devices at every second period shorter than the first period, storage means for holding electric signal charges produced from the solid-state image-pickup devices as a reference signal when the photoelectric conversion plane of the solid-state image-pickup devices is not irradiated with the optical image due to a difference between the first and second periods, and means for correcting an image signal constituted by the electric signal charges produced from the solid-state image-pickup devices in accordance with the reference signal when the photoelectric conversion plane of the solid-state image-pickup devices is irradiated with the optical image.

According to the above conventional technique, in the same way as a black reference signal is inserted between picture signals by using a rotating shutter disk or electronic shutter, the picture signals can be produced from the solid-state image-pickup devices. As described in the above publication, in a defective pixel correcting circuit, a digitized signal is written in a frame memory as a reference image of a corresponding field during a reference signal term. During other term excepting the reference signal term, a corresponding field image stored in the frame memory is subtracted from the digitized field signal to be produced, so that a defective pixel is corrected while noise having a fixed pattern is detected in real time to thereby eliminate preparation work of defective-pixel data upon fabrication and even if a defective pixel is changed in use, an automatically corrected image can be acquired to improve the image quality.

With such structure, however, a pause period is produced in an output signal of the defective pixel correcting circuit. Accordingly, when a moving picture is to be viewed in real time, it is necessary to obtain a video signal having a continuous time interval by passing the output signal through a time-axis expansion circuit. However, in order to adjust a timing by the time-axis expansion circuit, a considerably large-scale circuit configuration must be provided to thereby increase a cost.

Further, since the video signal corresponding to the aforementioned pause period is not imaged, the contents of the picture are interrupted at the pause period and there is a possibility that the contents of the picture become discontinuous as compared with the required contents of the picture even if the time axis is expanded regardless of the interruption of the contents to make the time interval continuous.

SUMMARY OF THE INVENTION

It is an object of the present invention to provide a defective pixel detecting method and an image-pickup apparatus for correcting a defective pixel in real time to produce a video signal by using the detecting method capable of detecting a defective pixel in real time by using a video signal imaged during an image signal term without the need of providing a reference signal term separately from the video signal term and without using a large-scale circuit such as the above time-axis expansion circuit as in the prior art.

In order to achieve the above object, according to an aspect of the present invention, a method of detecting a defective pixel of an image-pickup apparatus having a plurality of solid-state image-pickup devices each receiving a respective one of spectral lights incident to the image-pickup apparatus, comprises the steps of generating a signal level relating to a pixel which is measured whether it is a defective pixel or not (hereinafter called the inspected pixel) on a solid-state image-pickup device on the basis of a signal level produced from an inspected pixel in the solid-state image-pickup device and signal levels produced from a plurality of pixels in the vicinity of such inspected pixel in the solid-state image-pickup device, and determining the defective pixel in the solid-state image-pickup devices on the basis of such signal level.

The present invention is achieved on the basis of the Inventors' discovery that a video signal level of a normal pixel is the same degree as video signal levels of surrounding pixels thereof in an overwhelming majority and accordingly a value of the video signal level of the normal pixel is the same degree as a average value of the video signal levels of the surrounding pixels, whereas, for example, when a white defect occurs in a video due to a defective pixel, a value of a video signal level (defect signal level) of the defective pixel (pixel causing white defect) is relatively larger than an average value of video signal levels of the surrounding pixels and a difference value (difference) obtained by subtracting the average value from the value of the defect signal level is also large. Further, the present invention is based on the inventors' further discovery that when a defective pixel is present, only one of a plurality of pixels in the corresponding same image-pickup position among a plurality of solid-state image-pickup devices corresponding to spectral lights for R, G and B in the image-pickup apparatus may be defective, that is, two or more pixels of them may be not defective simultaneously.

In an embodiment, the value such as the signal level relating to the defective pixel is produced from a difference between the value of the signal level from the inspected pixel and an average value of signal levels from the plurality of pixels in the vicinity of the inspected pixel in the solid-state image-pickup device. The difference is calculated for each spectral light.

The determining step comprises calculating, for each spectral light, deviations of the difference of the solid-state image-pickup device from average values of differences of at least other solid-state image-pickup devices and comparing the calculated deviations with one another to identify which one of the plurality of solid-state image-pickup devices has generated a defective pixel.

In an embodiment, when a deviation having a maximum absolute value of the deviations calculated for the plurality of solid-state image-pickup devices is larger than a predetermined threshold value, it is determined that the inspected pixel of the solid-state image-pickup device relating to the deviation having the maximum absolute value is a defective pixel.

Furthermore, in an embodiment, the plurality of pixels in the vicinity of the inspected pixel include a plurality of pixels adjacent to the inspected pixel on both sides thereof.

Further, the generating step and the determining step are implemented each time a video signal is produced from the plurality of solid-state image-pickup devices.

The image-pickup apparatus according to another aspect of the present invention comprises a separator for separating light incident to the image-pickup apparatus to provide a plurality of spectral lights, a plurality of solid-state image-pickup devices for receiving the spectral lights to produce video signals respectively, a comparator circuit for comparing a signal level from the inspected pixel on the solid-state image-pickup devices and signal levels from a plurality of pixels in the vicinity of such inspected pixel in order to generate a signal level relating to a defective pixel in the solid-state image-pickup device, a detection circuit for detecting a defective pixel on the plurality of solid-state image-pickup devices on the basis of the signal level obtained from the comparator circuit, a correction circuit responsive to the detection circuit for correcting a signal level from a defective pixel on the solid-state image-pickup device, and a video signal processing circuit for producing a video signal on the basis of corrected signal level from the correction circuit.

In an embodiment, the correction circuit includes circuits responsive to the detection circuit for replacing the defect signal from the inspected pixel of the solid-state image-pickup device which has generated the defective pixel by an average value of the signal levels from the plurality of pixels in the vicinity of the inspected pixel.

In a further embodiment, the correction circuit includes circuits responsive to the detection circuit for multiplying the defect signal from the inspected pixel which has generated a defect by a predetermined defective pixel correction coefficient to produce a corrected signal.

In an embodiment, the image-pickup apparatus includes a control circuit for changing at least one of a threshold for detecting the solid-state image-pickup device which has generated a defective pixel and the defective pixel correction coefficient in accordance with image conditions.

In an embodiment, the image-pickup apparatus is responsive to an external circuit for controlling whether the defect signal is to be corrected or not in accordance with the level of the defect signal from the inspected pixel which has generated a defect.

BRIEF DESCRIPTION OF THE DRAWINGS

The foregoing and other objects, features and advantages of the invention will be apparent from the following more particular description of the embodiments of the invention as illustrated in the accompanying drawings wherein.

DESCRIPTION OF THE EMBODIMENTS

Figure 2:
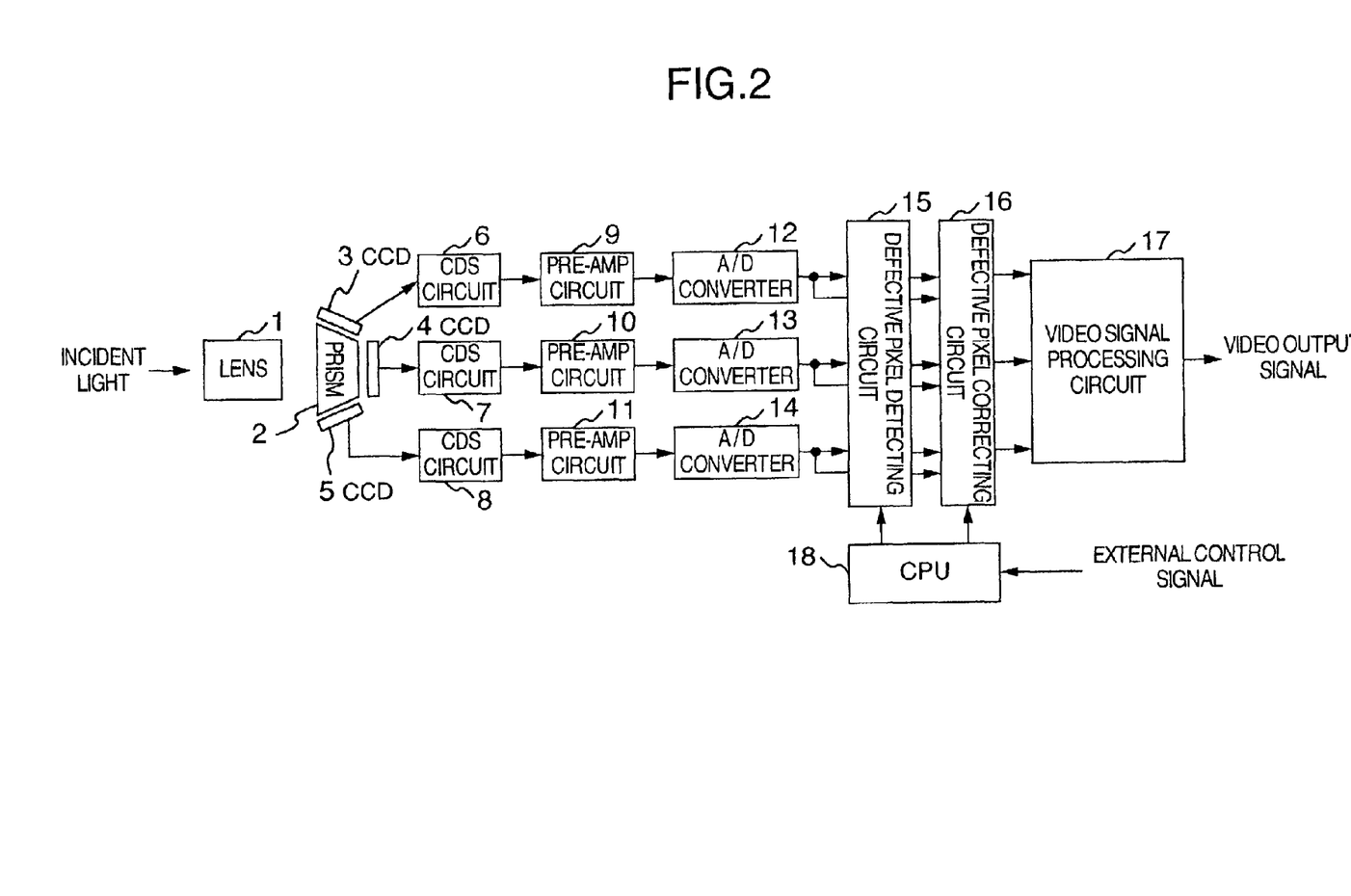
FIG. 2 is a block diagram schematically illustrating a television camera according to another embodiment of the present invention.

Embodiments of the present invention are now described with reference to the accompanying drawings. FIG. 2 is a block diagram schematically illustrating a television camera according to an embodiment of the present invention. In FIG. 2, numeral 1 denotes a lens for focusing light incident from an object to be imaged, 2 a prism or separator for separating the incident light passing through the lens 1 into a plurality of spectral lights having wavelengths of, for example, red, green and blue (hereinafter abbreviated as R, G and B, respectively), 3, 4 and 5 solid-state image-pickup devices (CCD) having a plurality of light receiving elements each receiving the spectral light from the prism 2 to convert it into an electric signal in accordance with an amount of spectral light received in each pixel and storing electric charges obtained by the conversion.

Numerals 6, 7 and 8 denote correlation double sampling (CDS) circuits inputted with video signals produced by successively reading out the electric charges stored in the image-pickup devices 3, 4 and 5 from the light receiving elements and for removing noise components contained in the inputted video signals to sample and hold only signal components, so that the video signals from which the noise components are removed are produced. The CDS circuit is a well-known circuit constituted by a clamp circuit for successively clamping a level of a video signal during a clamping period repeated in a video signal produced from associated solid-state image-pickup devices to a predetermined level and a sample-and-hold circuit for sampling and holding a level during a signal period, of the clamped video signal, although not shown in the drawing.

Numerals 9, 10 and 11 denote pre-amplifier circuits in which the video signals produced from the CDS circuits 6, 7 and 8 are subjected to video signal processing such as gain correction and gamma correction, and numerals 12, 13 and 14 denote A/D converters for converting the video signals subjected to the video signal processing in the pre-amplifier circuits 9, 10 and 11 into digital signals.

Numeral 15 denotes a defective pixel detecting circuit for detecting a defective pixel for each pixel on the basis of digital video signals for respective colors produced from the A/D converters 12, 13 and 14 and producing a signal indicative of a position of a detected pixel and a defect signal level of the detected defective pixel. Numeral 16 denotes a defective pixel correcting circuit for correcting the defective pixel of the digital video signals produced from the A/D converter 12, 13 and 14 in accordance with the signal indicative of the detected pixel position and the defect signal level of the defective pixel detected by the defective pixel detecting circuit 15 and producing the corrected video signals to be supplied to a video signal processing circuit 17. In the video signal processing circuit 17, the corrected video signals are subjected to conversion processing for video signal format or the like and supplied to the subsequent stage (not shown).

Numeral 18 denotes a central processing unit (CPU) for controlling the image-pickup devices 3, 4 and 5 and the aforementioned circuits so as to operate at a predetermined timing and establishing external control between the image-pickup apparatus and an external apparatus (not shown).

Description is now made to a general situation in which the inventive defective pixel detecting method may be suitably applied in the case where a white defect occurs in a video image due to a defective pixel.

A detect signal level of a defective pixel causing a white defect appears as a peak component having a signal level higher than video signal levels of surrounding pixels thereof. Accordingly, a value of the video signal (defect signal) level of the defective pixel causing the white noise is relatively larger than an average value of the video signal levels of the surrounding pixels and a difference value (difference) obtained by subtracting the average value from the value of the defect signal level is also large similarly.

On the other hand, video signal levels of normal pixels having no defect are almost the same as the video signal levels of the surrounding pixels in an overwhelming majority in almost all image-picking up conditions, for example, in conditions where imaging is usually made by an image-pickup apparatus in an almost same viewing condition as the general viewing condition of a human being. In other words, in the case when an image in the range of a view field perceived by a human being is picked up with about the same view angle and from about the same distance of a human being, the image is taken as an image in which chromaticity and brightness between adjacent pixels of the imaged video are relatively smoothly changed, unlike a video image, such as the video produced by computer graphics, which is likely to have a substantial difference in chromaticity and brightness between adjacent pixels. Accordingly, the value of the video signal level of the normal pixel is the same degree as the average value of the video signal levels of the surrounding pixels and the difference value obtained by subtracting the average value from the value of the video signal level of the normal pixel is relatively small.

Further, for example, when it is assumed that a certain inspected pixel of an R channel is a white defect causing defective pixel, the possibility that any one or both of pixels of G and B channels at the image-pickup point of the incident (imaging) light corresponding to the inspected pixel of R channel are also defective similarly to the inspected pixel of the R channel is very small. That is, it can be safely said that only one pixel of the R, G and B channel pixels corresponding to any image-pickup point in the incident light is defective at the most.

Accordingly, in an example where an inspected pixel for R channel corresponding to a certain image-pickup point within incident light to be imaged is assumed to have a white defect, it is considered that a difference value between a signal level of the inspected pixel of R channel and an average value of signal levels of surrounding pixels thereof is relatively large as described above, and a difference value between a signal level of a pixel of G channel corresponding to the image-pickup point and an average value of signal levels of surrounding pixels thereof and a difference value between a signal level of a pixel of B channel and an average value of signal levels of surrounding pixels thereof are relatively small even in either case of G and B channels.

Accordingly, respective difference values for R, G and B channels of pixels corresponding to the image-pickup point in the incident light may be processed so as to be compared with one another, for example, so that whether a defective pixel occurs in a pixel for any one of R, G and B channels or not can be detected.

A defective pixel detecting method according to an embodiment of the present invention is now described. Incident light passing through the lens 1 of the image-pickup apparatus according to the present invention is separated by the prism 2 to obtain spectral lights for R, G and B channels. The spectral lights for the respective channels are received by the solid-state image-pickup devices 3, 4 and 5, respectively. In each solid-state image-pickup device, the spectral light is subjected to photoelectric conversion in accordance with an amount of spectral light received in each pixel to obtain electric charges and the electric charges are stored therein and further outputted successively as a video signal so that the video signals for respective channels are produced. The video signals are supplied through the CDS circuits 6, 7 and 8, the pre-amplifier circuit 9, 10 and 11 and the A/D converters 12, 13 and 14 to the defective pixel detecting circuit 15.

Figure 1:
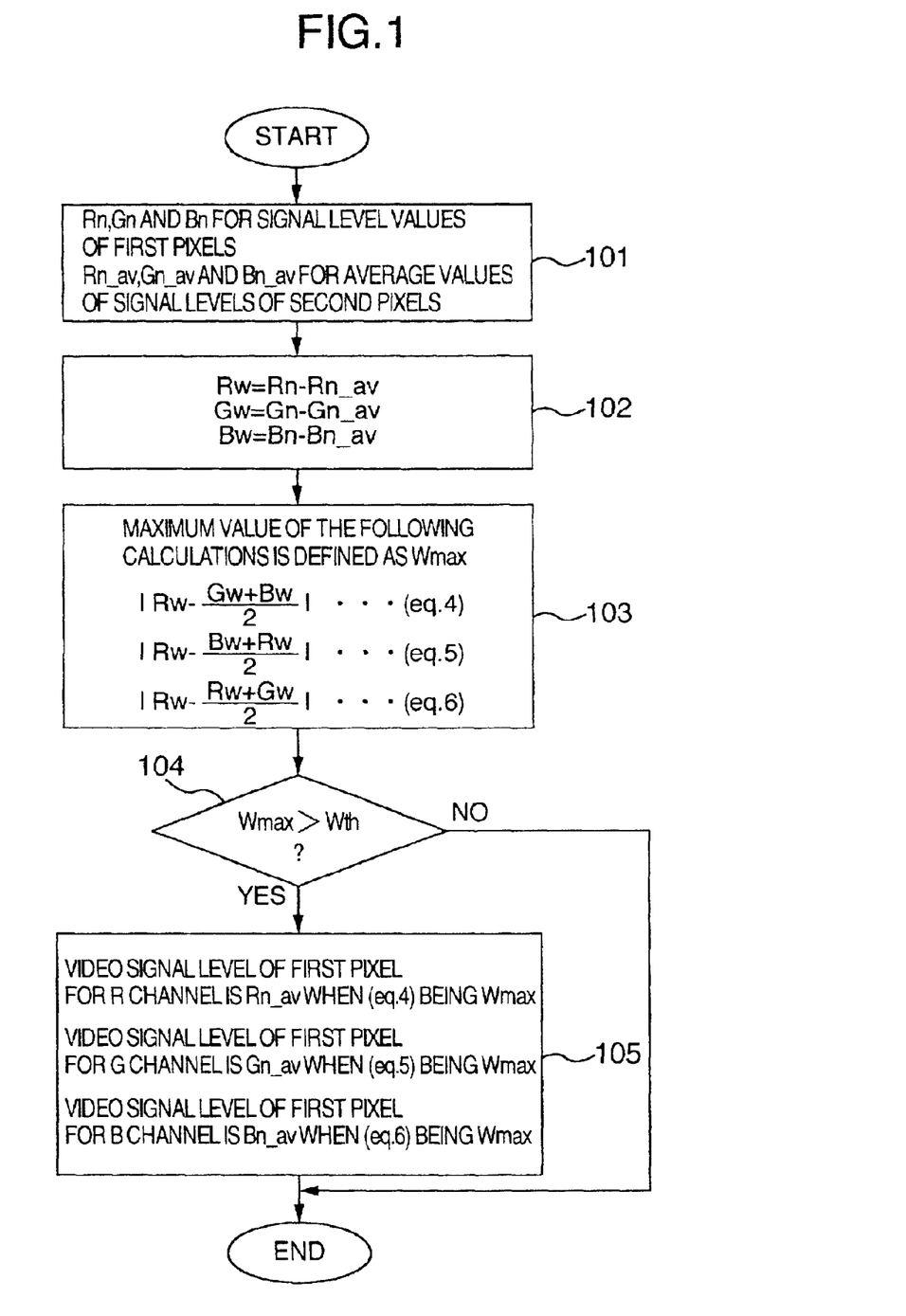
FIG. 1 is a flow chart showing a defective pixel detection and correction procedure according to an embodiment of the present invention.

The defective pixel detecting circuit 15 detects a defect signal portion from a defective pixel of the inputted video signals by using the signal processing procedure as shown in FIG. 1.

In the detection procedure, video signal level values for pixels (hereinafter referred to as a first pixel in each channel) of the respective channels corresponding to an image-pickup point of interest within incident light to be imaged, for example, an image-pickup point An corresponding to an n-th element of the plurality of light receiving elements arrayed in a matrix on the solid-state image-pickup device are assumed to be Rn, Gn and Bn for the respective channels. Further, a plurality of pixels in the vicinity of the first pixels for the respective channels, that is, pixels (hereinafter referred to as second pixels for each channel) adjacent to or in the vicinity of the first pixels are properly selected and average values of video signal levels of the selected second pixels are calculated. The calculated average values are Rn_av, Gn_av and Bn_av, respectively (step 101 of FIG. 1).

Figure 4:
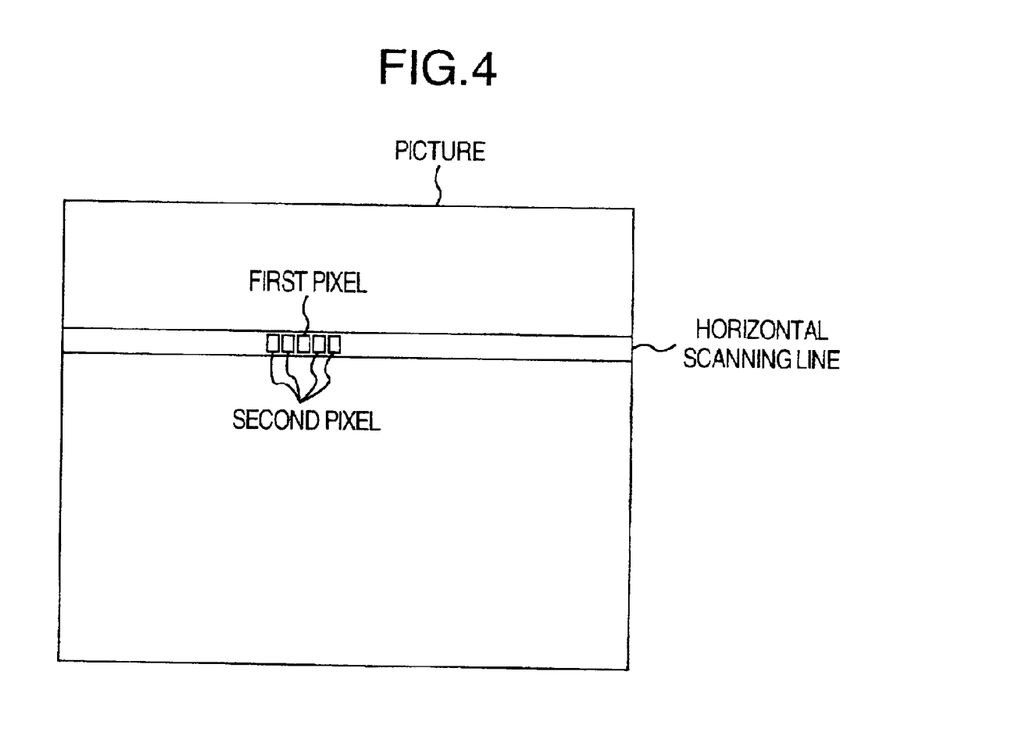
FIG. 4 is a diagram showing an example of arrangement of pixels in the vicinity of an inspected pixel used to detect a defective pixel.

FIG. 4 shows an example of an arrangement of the second pixels. In FIG. 4, when a certain one of a plurality of pixels arranged side by side on a certain horizontal scanning line of a picture composed of a plurality of horizontal scanning lines is assumed as the first pixel, two pixels adjacent to the first pixel on the right and left side thereof and two pixels adjacent to the two adjacent pixels are defined as the second pixels.

Then, difference values (differences) for each channel are calculated as Rw, Gw and Bw by subtracting average values of video signal levels of the second pixels obtained above from video signal levels of the first pixels as shown by the following equations 1, 2 and 3, respectively (step 102 of FIG. 1).

$$Rw = Rn - Rn\_av \quad (\text{eq. 1})$$

$$Gw = Gn - Gn\_av \quad (\text{eq. 2})$$

$$Bw = Bn - Bn\_av \quad (\text{eq. 3})$$

Next, in order to compare the calculated differences Rw, Gw and Bw with one another, deviations for each channel are calculated by subtracting an average value of the differences for channels other than that channel from the difference for that channel and a maximum one of the calculated deviations for each channel is selected as Wmax. The deviations for each channel are expressed by the following equations 4, 5 and 6 in the example shown in FIG. 1 (step 103 of FIG. 1).

$$\text{for R channel } |Rw - (Gw + Bw)/2| \quad (\text{eq. 4})$$

for G channel $|Gw-(Bw+Rw)/2|$ (eq. 5)

for B channel $|Bw-(Rw+Gw)/2|$ (eq. 6)

Alternatively, as equations of the deviations for each channel, average values of the differences of three channels for R, G and B may be used as the following equations 7, 8 and 9 to select the maximum value Wmax from the values calculated from these equations.

for R channel $|Rw-(Rw+Gw+Bw)/3|$ (eq. 7)

for G channel $|Gw-(Rw+Gw+Bw)/3|$ (eq. 8)

for B channel $|Bw-(Rw+Gw+Bw)/3|$ (eq. 9)

After the maximum value Wmax has been obtained as above, it is determined whether the maximum value Wmax is larger than a predetermined threshold value Wth or not (step 104 of FIG. 1).

The threshold value Wth may be determined such that when the maximum value Wmax is smaller than the threshold value the existence of a defective pixel is hard to be recognized by perception of a human being even if its defective pixel signal is used to display an imaged picture.

By virtue of determining whether the maximum value Wmax is a value based on the video signal level of a pixel relating to a defective pixel or not, the first pixel of the channel relating to a deviation for the maximum value Wmax can be detected as a defective pixel causing the defective pixel corresponding to the image-pickup point, when the maximum value Wmax is larger than the predetermined threshold value Wth,. On the other hand, when the maximum value Wmax is smaller than the predetermined threshold value Wth, it is determined that no defect occurs in the pixel corresponding to the image-pickup position.

By implementing the defective pixel detecting procedure of the present invention described above, when any defective pixel is detected, the defective pixel detecting circuit 15 produces a signal (defective pixel position signal) indicative of a position of the defective pixel based on the detected result to be supplied to the defective pixel correcting circuit 16.

The defective pixel correcting circuit 16 produces a correction signal on the basis of the inputted defective pixel position signal and the video signals of the surrounding pixels about the defective pixel produced from any of the A/D converters 12, 13 and 14.

Figure 3:
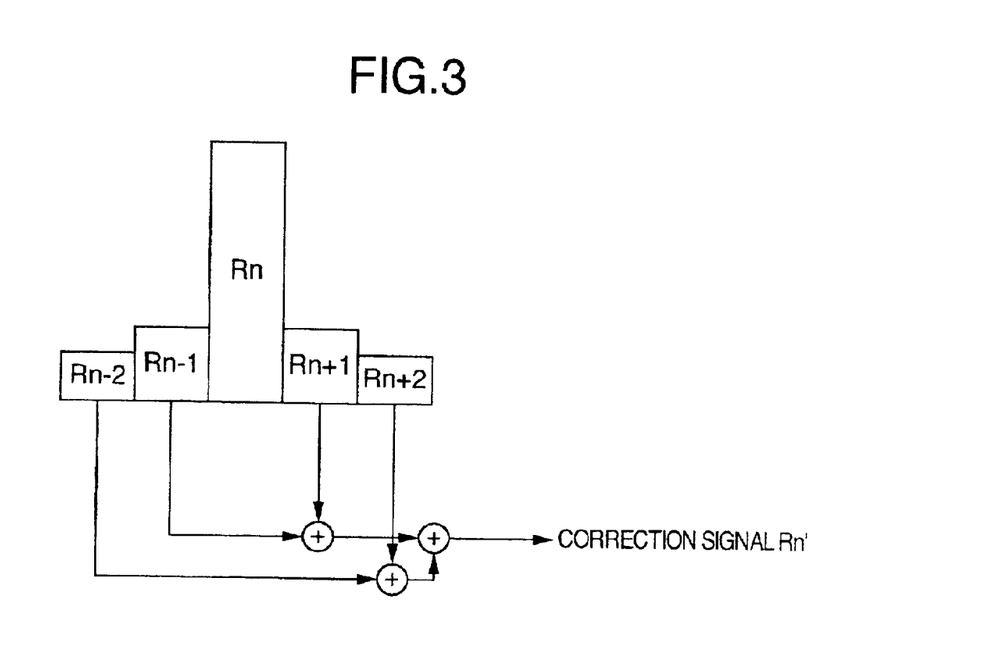
FIG. 3 is a diagram explaining an example of a correction signal producing method.

FIG. 3 is a diagram explaining an example of the correction signal producing method. In the example shown in FIG. 3, supposing that Rn is a defect signal level of a defective pixel, a level Rn' of the correction signal thereof is produced by calculating an average value from video signal levels Rn−2, Rn−1, Rn+1 and Rn+2 of four adjacent pixels. In this connection, the correction signal level and the average value of the video signal levels of the second pixels described in the calculation of the aforementioned differences may be calculated by the same equations and in this case calculated by the following equations 10, 11 and 12.

$Rn\_av=(R_{n-2}+R_{n-1}+R_{n+1}+R_{n+2})/4$ (eq. 10)

$Gn\_av=(G_{n-2}+G_{n-1}+G_{n+1}+G_{n+2})/4$ (eq. 11)

$Bn\_av=(B_{n-2}+B_{n-1}+B_{n+1}+B_{n+2})/4$ (eq. 12)

Further, it is needless to say that the correction signal levels and the average values are not necessarily required to be the same values and may be calculated by using various calculation methods and combined signals. For example, the defect signal from the first pixel can be multiplied by a predetermined correction coefficient to produce the correction signal. Further, the correction coefficient may be changed.

Figure 5:
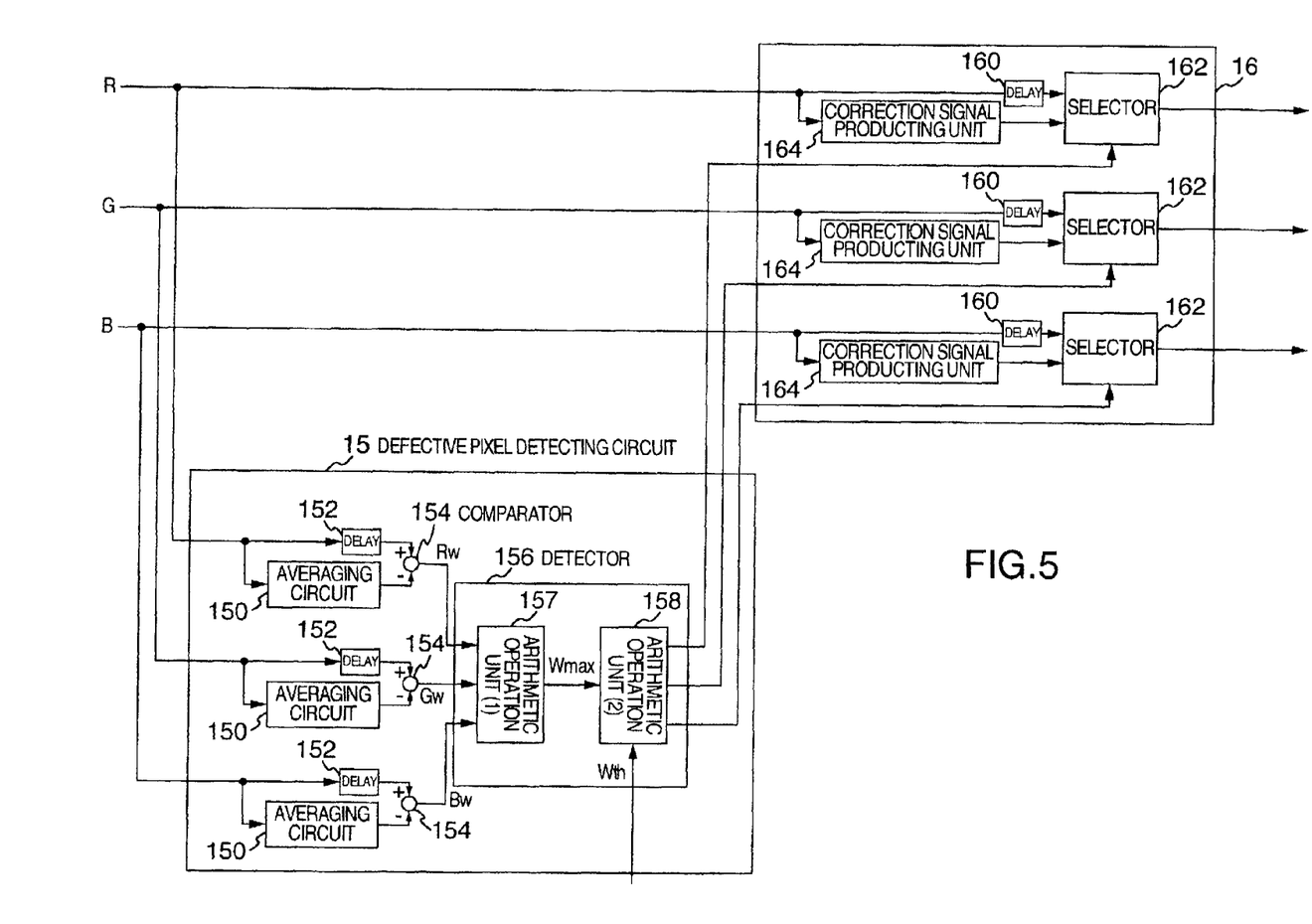
FIG. 5 is a block diagram schematically illustrating a defective pixel detecting circuit and a defective pixel correcting circuit used in the television camera of FIG. 2.

FIG. 5 illustrates an example of a detailed circuit configuration of the defective pixel detecting circuit 15 and the defective pixel defect correcting circuit 16. Referring now to FIG. 5, the defective pixel detecting circuit 15 and the defective pixel correcting circuit 16 are described in more detail.

In FIG. 5, the digital video signals for R, G and B converted by the A/D converters 12 are supplied to the defective pixel detecting circuit 15 and the defective pixel correcting circuit 16. In the defective pixel detecting circuit 15, the R, G and B digital video signals are supplied to average value producing circuits 150 and delay circuits 152. The average value producing circuits 150 calculate average values of signal levels of the second pixels. The delay circuits 152 delay the inputted R, G and B video signals in accordance with delay amounts caused by average value calculation. The average values and the delayed signals are supplied to comparators 154. In the comparators 154, differences Rw, Gw and Bw are calculated. The calculated differences Rw, Gw and Bw are supplied to a detector 156. In the detector 156, an arithmetic operation unit (1) 157 calculates deviations from the differences Rw, Gw and Bw and selects a maximum value of the calculated deviations as Wmax. Further, an arithmetic operation unit (2) 158 compares the selected maximum value Wmax with a threshold value Wth.

In the comparison, when the maximum value Wmax is larger than the threshold value Wth, the first pixel of the video signal for a color of the deviation for the maximum value Wmax is detected as being a pixel in which a defective pixel occurs and the detector 156 produces a video signal selection control signal in accordance with a video signal timing of the first pixel for that color to be supplied to the defective pixel correcting circuit 16. On the other hand, when the maximum value Wmax is smaller than the threshold value Wth, it is regarded that there is no pixel having a defect and the video signal selection control signal is not produced.

In the defective pixel correcting circuit 16, the R, G and B video signals from the A/D converters 12 are inputted through delay circuits 160 to selectors 162 for respective colors. The selectors 162 are further supplied with correction signals produced by correction signal producing units 164 on the basis of the R, G and B video signals supplied from the A/D converters 12. The selectors 162 supplied with the video signals and the correction signals produce the correction signal when the video signal selection control signals produced from the defective pixel detecting circuit 15 are supplied to the selectors. On the other hand, when the control signal is not supplied, the selectors produce the video signals.

As described above, when Rn is assumed to be the defect signal level of a defective pixel, the correction signal level Rn', in this example Rn__av, produced in accordance with the defective pixel position signal is used as the video signal level of the defective pixel (first pixel) instead of the defect signal level Rn as illustrated in step 105 of FIG. 1 and the defective pixel is corrected by the defect signal level Rn'.

While the processing procedure for the defective pixel detection and correction for a certain image-pickup point in the incident light to be imaged relating to an inspected pixel has been described, the procedure can be repeated successively while changing a pixel to be inspected successively each time the video signal for each pixel is produced in response to the output operation of the video signal from the solid-state image-pickup device, so that the defective pixel detection and correction can be performed pixel by pixel in real time.

Further, in the present invention, a signal for setting the defective pixel correction is sent to the CPU circuit 18 by operator's operation using a menu picture not shown of the image-pickup apparatus or by an external control signal produced by using the external control function, so that a signal for controlling the defective pixel detecting circuit 15 and the defective pixel correcting circuit 16 is sent to these circuits 15 and 16 from the CPU circuit 18. With such control, control as to whether correction is made for each defective pixel or not may be made externally and the defect signal level of the defective pixel or the correction coefficient for the defective pixel correction may be changed in accordance with image conditions (presence of storage, storage time, degree of video gain and the like).

Note that the "presence of storage" mentioned above in connection with the image conditions represents a storage high-sensitive mode imaging or normal imaging. Also, the "storage time" is a time for storing electric charges obtained by irradiating imaging light for picking up one frame image in the storage high-sensitive mode and being subjected to photoelectric conversion. The "degree of video gain" is an actually set gain when an amplification factor of a signal amplifier before D/A conversion is variable.

As described above, according to the embodiments, the defective pixel detection or correction can be made pixel by pixel in real time by repeating processing successively while a pixel to be inspected is changed each time the video signal for each pixel is produced without the need of providing a reference signal period separately from the video signal period and without using a large-scale circuit such as the defective pixel correcting circuit as in the prior art and the need of previously detecting a defective pixel position and the time of detecting the defective pixel position again and writing it in a memory or the like can be eliminated even if the number of defective pixels is increased in the prior art.

Further, control as to whether correction is made for each defective pixel in accordance with a defect signal level of a detected defective pixel or not can be made externally and the defect signal level of the defective pixel or the correction coefficient for the defective pixel correction can be changed in accordance with image conditions (presence of storage, storage time, degree of video gain and the like). For example, a white defect detection level (W) can be changed in accordance with a storage time so that increased and reduced white defect caused by change of the storage time can be corrected properly. In such a manner, correction in accordance with conditions of the imaged picture can be made.

What is claimed is:

1. A method of detecting a defective pixel of an image-pickup apparatus having a plurality of solid-state image-pickup devices each receiving a respective one of spectral lights obtained by separating light incident to said image-pickup apparatus, said method comprising the steps of:

generating a value relating to a defect of an inspected pixel on each solid-state image-pickup device based on a signal level produced from said inspected pixel and signal levels produced from a plurality of pixels in the vicinity of said inspected pixel on said solid-state image-pickup device; and detecting a defective pixel based on said value relating to a defect of said inspected pixel of said solid-state image-pickup device, wherein said generating step is a step of calculating a difference between a signal level from said inspected pixel and an average value of signal levels from said plurality of pixels in the vicinity of said inspected pixel on said solid-state image-pickup device, said difference being calculated in each solid-state image-pickup device, and wherein said detecting step comprises the steps of:

calculating deviations of said difference of each said solid-state image-pickup device from average values of differences of at least other solid-state image-pickup devices, and comparing said calculated deviations with one another to determine the defective pixel on said solid-state image-pickup device.

2. A method according to claim 1, wherein, in said detecting step, when said deviations calculated for said plurality of solid-state image-pickup devices is larger than a predetermined threshold value, it is detected that said inspected pixel on said solid-state image-pickup device is a defective pixel.

3. A method according to claim 1, wherein said average value of said differences is an average value of differences of said plurality of solid-state image-pickup devices.

4. An image-pickup apparatus, comprising:

a separator for separating light incident to said image-pickup apparatus to provide a plurality of spectral lights;

a plurality of solid-state image-pickup devices for receiving said spectral lights to produce video signals respectively;

a comparator circuit for comparing a signal level from an inspected pixel and signal levels from a plurality of pixels in the vicinity of said inspected pixel on said sold-state image-pickup devices;

a detection circuit for detecting a defective pixel on said plurality of solid-state image-pickup devices based on said signal level obtained from said comparator circuit;

a correction circuit, responsive to said detection circuit, for correcting a signal level from said defective pixel on said solid-state image-pickup device; and a video signal processing circuit for producing a video signal based on the corrected signal level from the correction circuit, wherein said comparator circuit calculates, in each said solid-state image-pickup device, a difference between a value of the signal level from said inspected pixel and an average value of signal levels from said plurality of pixels in the vicinity of said inspected pixel on said solid-state image-pickup device and generates a value relating to said defective pixel, and wherein said detection circuit comprises:

a first arithmetic operation circuit for calculating, in each solid-state image-pickup device, deviations of said difference of each solid-state image-pickup device from average values of differences of at least other solid-state image-pickup devices and comparing said calculated deviations with one another to detect said defective pixel on said solid-state image-pickup device.

5. An image-pickup apparatus according to claim 4, wherein said average value of said differences is an average value of differences of said plurality of solid-state image-pickup devices.

6. An image-pickup apparatus according to claim 4, wherein said detection circuit comprises:

a second arithmetic operation circuit for detecting that said inspected pixel is a defective pixel, when said deviations calculated in said plurality of solid-state image-pickup devices is larger than a predetermined threshold value.

7. An image-pickup apparatus according to claim 6, wherein said correction circuit comprises:

circuits responsive to said detection circuit for multiplying a defect signal from said inspected pixel by a predetermined defect correction coefficient to produce a corrected signal.

8. An image-pickup apparatus according to claim 7, further comprising:

a control circuit for changing at least one of said predetermined threshold and said defect correction coefficient in accordance with image conditions.

9. An image-pickup apparatus according to claim 8, wherein said image conditions contain at least one of presence/absence of storage, a storage time and a video gain in said solid-state image-pickup device.

* * * * *